United States Patent [19]

Frost et al.

[11] Patent Number: 5,797,723

[45] Date of Patent: Aug. 25, 1998

[54] TURBINE FLOWPATH SEAL

[75] Inventors: Wilson Frost; John R. Staker; John H. Starkweather, all of Cincinnati, Ohio

[73] Assignee: General Electric Company, Cincinnati, Ohio

[21] Appl. No.: 748,936

[22] Filed: Nov. 13, 1996

[51] Int. Cl.$^6$ ..................................................... F04D 29/08

[52] U.S. Cl. .................................. 415/174.2; 415/231

[58] Field of Search ........................... 415/170.1, 173.1, 415/173.3, 174.2, 229, 230, 231

[56] References Cited

U.S. PATENT DOCUMENTS

| | | | |
|---|---|---|---|
| 4,897,021 | 1/1990 | Chaplin et al. | 415/174.2 |
| 5,118,120 | 6/1992 | Drerup et al. | 415/174.2 |
| 5,188,507 | 2/1993 | Sweeney | 415/174.2 |
| 5,201,846 | 4/1993 | Sweeney | 415/174.2 |

OTHER PUBLICATIONS

General Electric Company, "CMF56–5C HPT Improved AFT Outer Band Sealing," two drawing figure excerpts, in production service more than one year.

*Primary Examiner*—John T. Kwon
*Attorney, Agent, or Firm*—Andrew C. Hess; Patrick R. Scanlon

[57] ABSTRACT

A turbine seal includes a first arcuate segment defining a flowpath boundary between combustion gases and air, and includes a radially outwardly extending rail at one end thereof. A second arcuate segment is disposed coaxially with the first segment for defining a continuation of the flowpath boundary, and has a radially extending face adjoining the rail. A leaf seal bridges the rail and the face for sealing leakage therebetween, and a plurality of pins extend through the leaf seal for providing mounting to the rail. Each pin includes a head and an opposite tip, with the pins being fixedly joined to the rail solely about the pin tips for freely supporting the pin heads in a cantilever without obstruction therearound for eliminating supporting tabs. A leaf spring is mounted on the pins between the heads and the leaf seal to pre-load the leaf seal against the rail and face to effect the sealing therebetween.

10 Claims, 3 Drawing Sheets

TURBINE FLOWPATH SEAL

BACKGROUND OF THE INVENTION

The present invention relates generally to gas turbine engines, and, more specifically, to turbine flowpath seals therein.

A gas turbine engine includes a compressor for compressing air which is mixed with fuel and ignited in a combustor for generating hot combustion gases which flow downstream therefrom. The combustion gases flow through one or more turbine stages for extracting energy therefrom for powering the compressor and providing other useful work.

A turbine stage includes a stationary turbine nozzle having a plurality of circumferentially spaced apart vanes extending radially between outer and inner bands which define a flowpath for channeling the combustion gases therethrough. Disposed downstream of a nozzle stage is a turbine rotor including a plurality of circumferentially spaced apart rotor blades extending radially outwardly from a rotor disk, and surrounded by an annular shroud which defines a portion of the radially outer flowpath for the combustion gases. The turbine nozzles and rotor shrouds are separately manufactured and assembled into position in the engine. Accordingly, gaps are necessarily provided therebetween for both assembly purposes as well as for accommodating differential thermal expansion and contraction during operation of the engine.

The gaps between these stationary stator components must be suitably sealed for preventing leakage therethrough. In a typical high pressure turbine nozzle, a portion of the compressor air is bled therefrom and channeled through the nozzle vanes for cooling thereof. The use of bleed air reduces the overall efficiency of the engine and therefore is minimized whenever possible. The bleed air is at a relatively high pressure greater than the pressure of the combustion gases flowing through the turbine nozzle and therefore would leak into the exhaust flowpath without providing suitable seals between the stator components.

A typical seal used in turbine flowpaths is a leaf seal. Leaf seals are typically arcuate and are disposed end to end around the circumference of the stator components. For example, the radially outer band of the turbine nozzle includes axially spaced apart forward and aft rails. These rails extend radially outwardly, with the aft rail abutting a complementary surface on the adjoining shroud or shroud hanger for providing a primary friction seal therewith. The leaf seal provides a secondary seal at this junction, and bridges a portion of the aft rail and the shroud hanger for example.

In order to assemble and mount the leaf seals to the aft rail, each leaf seal typically includes mounting holes at opposite circumferential ends thereof through which are mounted corresponding mounting pins. Corresponding leaf springs are also used at respective ones of the mounting pins for preloading the loosely supported leaf seals against the aft rail and the shroud hanger. During operation when air pressure is developed outboard of the outer band, the air pressure provides a substantial loading force against the leaf seal for improving its sealing effectiveness with the aft rail and the shroud hanger.

In order to support the leaf seals, leaf springs, and mounting pins, the outer band typically includes a plurality of circumferentially spaced apart, radially extending tabs spaced axially from the aft rail. The tabs include through holes aligned with corresponding holes in the aft rail, and the pins are inserted through the tabs and into the aft rail and then fixedly joined thereto by tack welding the heads of the pins to the corresponding tabs. In this way, the mounting pins are supported from both ends to the tabs and aft rail, and the leaf seals and leaf springs are trapped in the recess defined between the tabs and the aft rail.

However, this mounting arrangement for the leaf seals is relatively complex and subject to damage during the assembly process in view of the relatively close quarters in this region. The leaf seals and springs are relatively small components, and the mounting tabs are therefore positioned relatively close to the aft rail which increases the difficulty of manufacturing these components. The aft rail and the tabs must be accurately machined to close tolerances, and the limited access provided due to their closeness increases the difficulty and cost of manufacturing. Furthermore, high temperature turbine nozzles are more commonly being formed of advanced superalloy metals, including single crystal metals. The integral tabs alter the basic shape of the band and further complicate the manufacture thereof.

Accordingly, an improved leaf seal installation arrangement is desirable for simplifying the manufacture and assembly thereof, and eliminating extraneous components.

SUMMARY OF THE INVENTION

A turbine seal includes a first arcuate segment defining a flowpath boundary between combustion gases and air, and includes a radially outwardly extending rail at one end thereof. A second arcuate segment is disposed coaxially with the first segment for defining a continuation of the flowpath boundary, and has a radially extending face adjoining the rail. A leaf seal bridges the rail and the face for sealing leakage therebetween, and a plurality of pins extend through the leaf seal for providing mounting to the rail. Each pin includes a head and an opposite tip, with the pins being fixedly joined to the rail solely about the pin tips for freely supporting the pin heads in a cantilever without obstruction therearound for eliminating supporting tabs. A leaf spring is mounted on the pins between the heads and the leaf seal to pre-load the leaf seal against the rail and face to effect the sealing therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
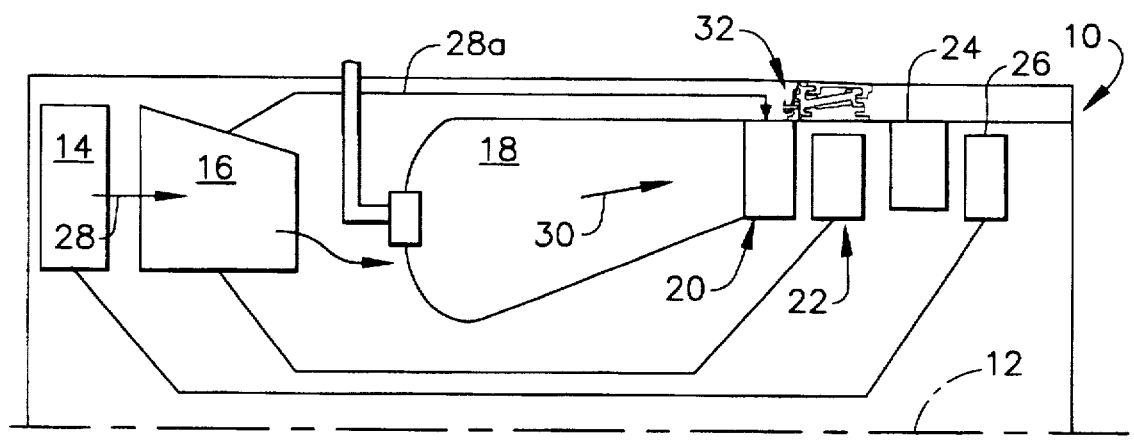
FIG. 1 is a schematic representation of an exemplary aircraft turbofan gas turbine engine including turbine components having flowpath seals in accordance with the present invention.

Illustrated schematically in FIG. 1 is a portion of an exemplary aircraft turbofan gas turbine engine 10 which is axisymmetrical about a longitudinal or axial centerline axis 12. The engine 10 includes in serial flow communication a fan 14, multistage axial compressor 16, annular combustor 18, high pressure turbine nozzle 20, a single stage high pressure turbine rotor 22, and one or more stages of low pressure turbine nozzles and rotors 26. These components may take any conventional configuration, with the high pressure rotor 22 being suitably joined to the compressor 16 by a first shaft, and the low pressure rotor 26 being joined to the fan 14 by a second coaxial shaft.

During operation, air flows downstream in turn through the fan 14 and compressor 16 and is pressurized therein and channeled to the combustor 18 wherein it is suitably mixed with fuel and ignited for generating hot combustion gases 30 which flow downstream through the several turbine components which extract energy therefrom for powering both the fan 14 and the compressor 16. The various stator and rotor components of the turbines downstream from the combustor 18 define a flowpath which channels the hot combustion gases therethrough for discharge from the engine.

A portion of the pressurized air 28 is suitably bled from the compressor 16 to provide bleed or cooling air 28a which is suitably channeled to various components of the turbines for providing cooling thereof, such as cooling of the high pressure nozzle 20. The bleed air 28a channeled around and through the high pressure nozzle 20 is at a substantially higher pressure than that of the combustion gases 30 flowing therethrough during operation.

Since the individual turbine components are separately manufactured and then assembled together in the engine 10, various joints or gaps are provided therebetween which must be suitably sealed for preventing leakage of the high pressure bleed air 28a into the combustion or exhaust flowpath. The use of bleed air for cooling turbine components necessary decreases the overall efficiency of the engine 10 and the use thereof is preferably minimized. It is desirable to provide suitable seals between the stationary or stator turbine components for reducing to a minimum the amount of cooling air leakage into the exhaust flowpath for increasing efficiency of the engine.

In accordance with the present invention, improved turbine flowpath seals may be provided where desired between the various turbine stator components for sealing leakage of the cooling air 28a into the exhaust flowpath. In the exemplary engine illustrated in FIG. 1, one embodiment of a turbine flowpath seal is designated 32 and is located between the high pressure turbine nozzle 20 and the high pressure turbine rotor 22, with it being understood that the seal may be suitably used and adapted for any analogous sealing position within the engine 10, and in particular between the various turbine stator components thereof.

Figure 2:
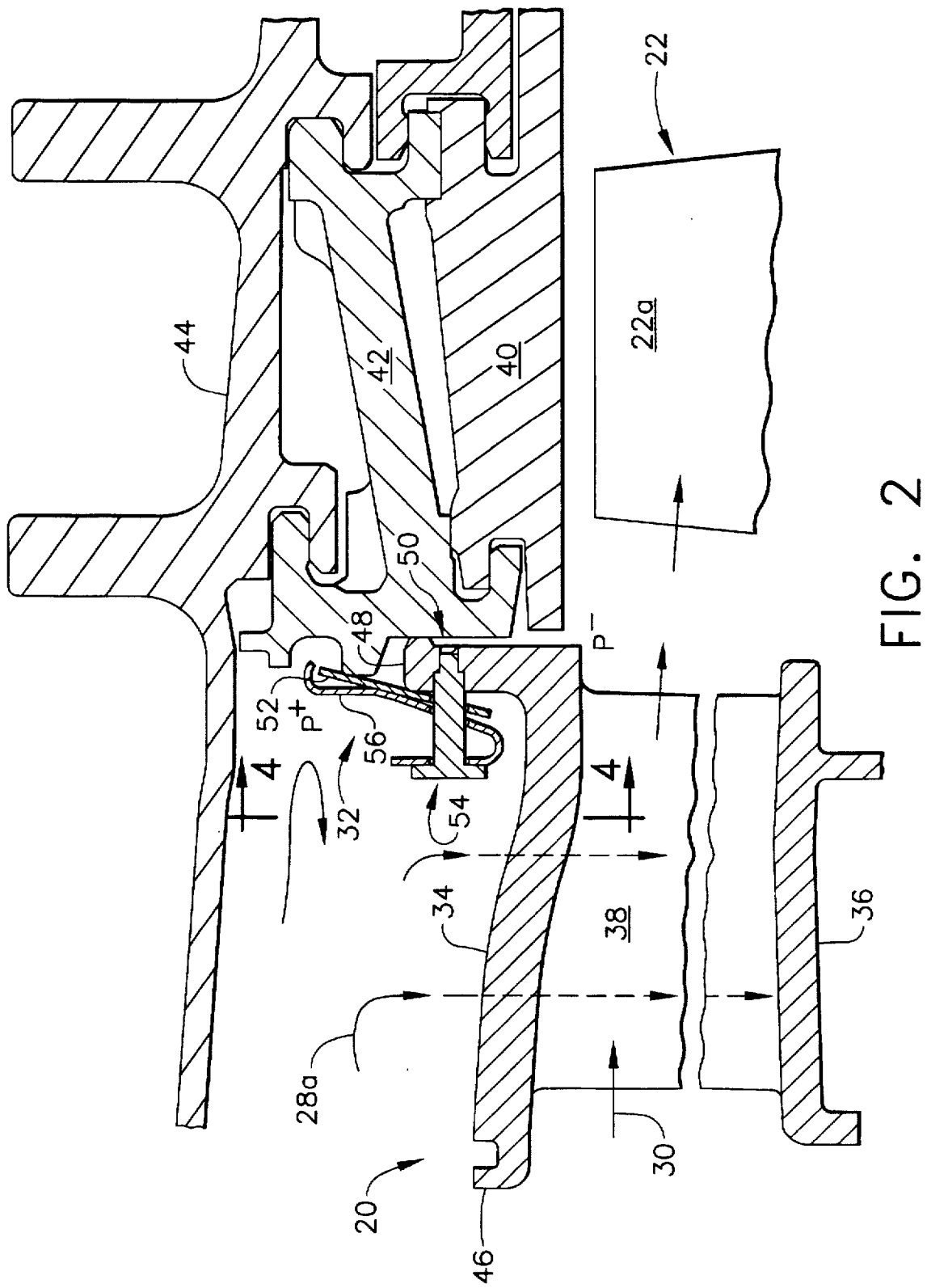
FIG. 2 is an enlarged partly sectional axial view of exemplary turbine components in the engine of FIG. 1 including a turbine nozzle and rotor shroud having a flowpath seal mounted therebetween in accordance with an exemplary embodiment of the present invention.

More specifically, and referring to FIG. 2, the high pressure turbine nozzle 20 is illustrated in more particularity adjacent to the high pressure turbine rotor 22 in an exemplary configuration of the turbine seal 32. The turbine nozzle 20 includes an annular radially outer band 34, and a coaxial annular radially inner band 36 between which extend radially and are fixedly joined thereto a plurality of circumferentially spaced apart hollow stator vanes 38. The nozzle 20 may take any conventional configuration for channeling therethrough the combustion gases 30 received from the combustor 18. The inner surface of the outer band 34 and the outer surface of the inner band 36 define portions of flowpath boundaries for the combustion gases 30 which are channeled downstream to the turbine rotor 22. The rotor 22 may take any conventional form having a plurality of circumferentially spaced apart rotor blades 22a extending radially outwardly from a rotor disk for extracting energy from the gases 30 and powering the compressor 16.

As discussed above, the cooling air 28a is suitably channeled around the nozzle 20 and flows radially inwardly through the individual vanes 38 for cooling thereof in a conventional manner. The cooling air 28a circulates around the outer surface of the outer band 34 and is at an elevated pressure ($P^+$) compared to the lower pressure ($P^-$) of the combustion gases 30 channeled through the nozzle 20.

Adjoining the outer band 34 axially downstream therefrom is a stationary shroud assembly which may take any conventional form for continuing the outer flowpath boundary radially outwardly of the turbine blades 22a. In the exemplary embodiment illustrated in FIG. 2, a plurality of circumferentially adjoining arcuate turbine shrouds 40 are suitably supported from a plurality of circumferentially adjoining shroud hangers 42, which in turn are supported from an annular outer casing 44 in a conventional arrangement using various forward and aft hooks and retention clips. The shroud 40 and hanger 42 are disposed coaxially with the turbine nozzle 20 for defining a radially outer flowpath boundary around the turbine blades 22a along which the combustion gases 30 flow from the nozzle 20.

The nozzle 20 is typically formed in a plurality of circumferentially adjoining segments for reducing stress therein due to differential thermal expansion and contraction. The nozzle outer band 34 includes axially spaced apart forward and aft rails 46, 48 which extend radially and circumferentially therewith in an integral, cast configuration.

The nozzle outer band 34 defines a first arcuate segment, with the radially inner surface of the outer band 34 defining an outer flowpath boundary between the combustion gases 30 inside or inboard thereof and the pressurized air 28a outside or outboard thereof. In the exemplary embodiment illustrated in FIG. 2, the turbine seal 32 is disposed at the aft rail 48 to seal against air leakage with the shroud hanger 42, which defines a second arcuate segment disposed coaxially with the outer band or first segment 34. In alternate embodiments, the individual shrouds 40 may be directly mounted to the outer casing 44, but in the exemplary embodiment illustrated in FIG. 2, the shrouds 40 are mounted to the shroud hangers 42, which in turn are mounted to the casing 44.

Accordingly, the seal 32 may be configured for sealing either the turbine shroud 40 itself or its shroud hanger 42 as shown. The shroud hanger 42 and the shroud 40 define an extension or continuation of the outer flowpath boundary of the outer band 34. The hanger 42 may have any suitable configuration and includes a radially extending forward face 50 directly facing and adjoining the aft rail 48.

Figure 3:
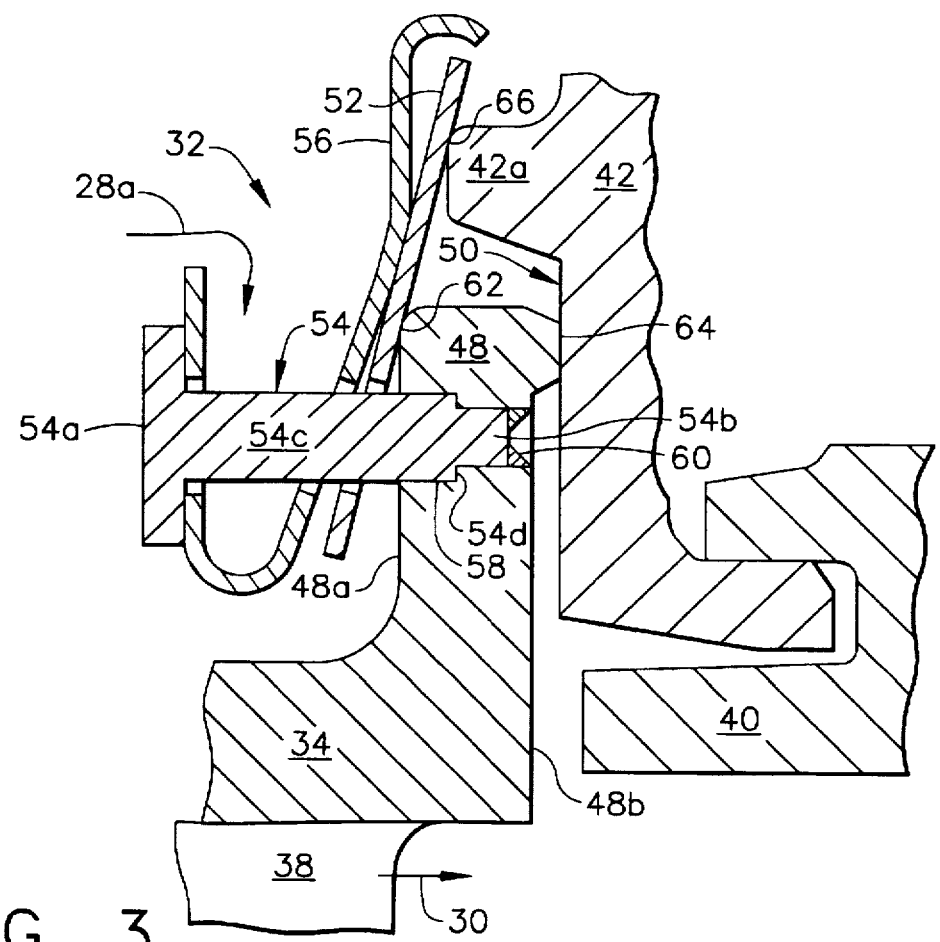
FIG. 3 is an enlarged axial sectional view of the turbine flowpath seal illustrated in FIG. 2 in a preferred embodiment.

The seal 32 is specifically configured for sealing the adjoining nozzle outer band 34 and shroud hanger 42 and is illustrated in more particularity in FIG. 3. The first and second arcuate segments defined by the outer band 34 and the shroud hanger 42 in this exemplary embodiment are sealed using a conventional arcuate leaf seal 52 which bridges the aft rail 48 and the forward face 50 for sealing leakage therebetween of the cooling air 28a outboard of the outer band 34.

A plurality of mounting pins 54 extend through the leaf seal 52, with each pin 54 having an enlarged head 54a at a distal end thereof, and a smaller tip 54b at an opposite proximal end thereof, with a generally cylindrical shank 54c extending therebetween. The pins 54 are suitably fixedly joined to the aft rail 48 in accordance with the present invention solely about the pin tips 54b for freely supporting the pin heads 54a and shanks 54c in a cantilever fashion without obstruction therearound which would otherwise be provided by conventional mounting tabs (not shown) formed integrally with the outer band 34.

A plurality of leaf springs 56 are mounted on respective ones of the pins 54 between the pin heads 54a and the leaf seal 52 to bias or pre-load the leaf seal 52 against the aft rail 48 and forward face 50 to effect sealing therebetween.

Figure 4:
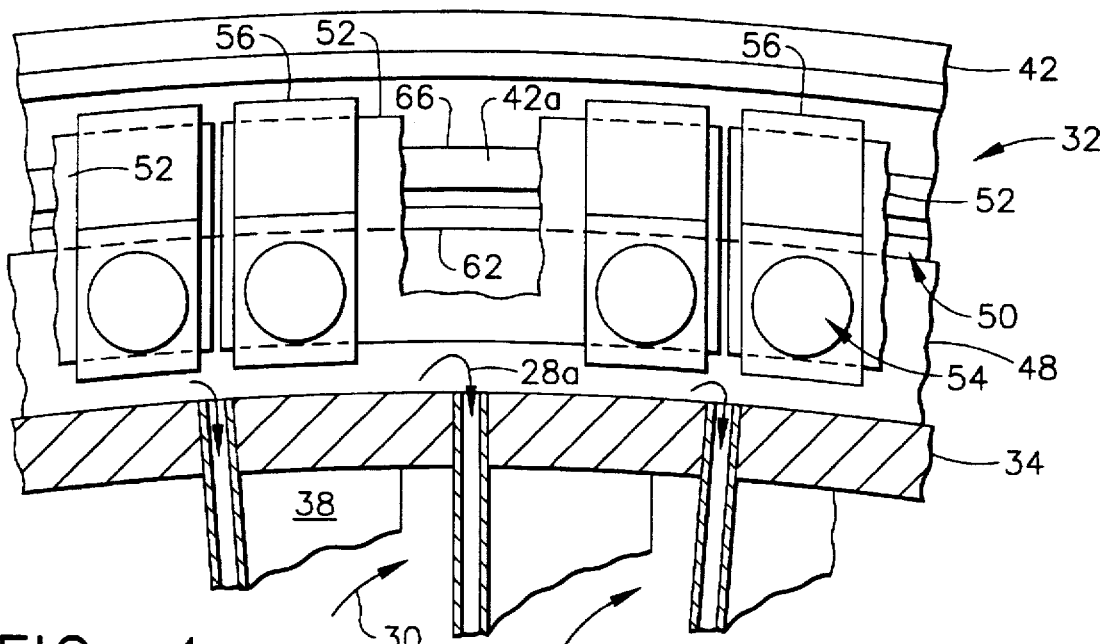
FIG. 4 is an aft facing, partly sectional radial view of the flowpath seal illustrated in FIG. 2 and taken generally along line 4—4.

FIG. 4 illustrates the assembled flowpath seal 32 in a forward looking aft view. The leaf seals 52 and leaf springs 56 may take any conventional form and are typically suitable metal for the hot turbine environment of the engine, with the leaf seals 52 being arcuate segments which circumferentially adjoin each other around the circumference of the nozzle 20. A pair of the mounting pins 54 is typically used for mounting the circumferentially opposite ends of the leaf seal 52 to the aft rail 48, with a corresponding pair of the leaf springs 56 mounted on the respective pins 54.

As shown in FIG. 3, each leaf spring 56 is a generally partially folded member with a suitable U-configuration for being trapped between pin head 54a and the leaf seal 52 in compression therebetween for biasing the leaf seal 52 against the aft rail 48 and forward face 50 of the shroud hanger 42. The leaf seal 52 and leaf spring 56 have suitable apertures therethrough for loosely surrounding the pin shank 54c in a generally conventional configuration.

However, in accordance with the present invention, the individual pins 54 are mounted solely at their tips 54b to the aft rail 48 for eliminating the conventional tabs which would otherwise be required to support the pin heads. Eliminating these tabs as integral components of the outer band 34 provides a substantially simplified and improved arrangement. By eliminating the tabs, the outer band 34 itself is simpler, and therefore may be more simply manufactured using casting techniques, and improving the ability to form single crystal alloys therein. Elimination of the tabs removes all obstructions on the forward side of the aft rail 48 for improving the required accurate machining thereof during manufacture.

However, the pins 54 must nevertheless be suitably mounted to the aft rail 48 in accordance with the present invention as further described hereinbelow. More specifically, the aft rail 48 illustrated in FIG. 3 includes first and second axially opposite sides 48a,b having a plurality of pin mounting holes 58 extending therebetween and completely through the aft rail 48. Corresponding ones of the pin tips 54b are disposed in respective ones of the mounting holes 58 and are fixedly joined thereto.

The pin heads 54a and leaf seals 52 are disposed adjacent to the rail first side 48a which faces forwardly in the upstream direction, and the pin tips 54b extend through the rail to the rail second side 48b which faces in the aft, downstream direction. The pin tips 54b are therefore readily accessible in the aft side of the rail 48 and may be conveniently fixedly joined thereto using conventional brazing, or tack welds 60 for example. The pin tips 54b may be slightly recessed in the rail second side 48b so that the tack welds 60 do not undesirably project outwardly from the rail second side 48b. Brazing or welding of the pin tips 54b inside the mounting holes 58 provides an effective metallurgical bond with the aft rail 48 which cannot inadvertently separate during operation.

The pin mounting holes 58 are preferably complementary in shape to the pin tips 54b in a suitably tight assembly therewith with relatively small clearances therebetween. In this way, the individual pins 54 may be securely attached to the aft rail 48 solely at their tip ends leaving the remainder of the pins 54 freely supported in a cantilever fashion for eliminating the need for a supporting tab at the head end of the pins 54.

Since the leaf springs 56 are preferably slightly compressed when assembled to provide a suitable pre-load on the leaf seals 52, it is desirable to accurately position the pin heads 54a at a predetermined axial distance from the rail first side 48a. This is preferably accomplished by providing each of the pins 54 with a stepped shoulder 54d between the pin head 54a and the pin tip 54b for axially abutting the rail 48 around the mounting hole 58. The shoulder 54d is located adjacent to the pin tip 54b and may be created by simply forming the pin tip 54b with a suitably smaller outer diameter than the diameter of the pin shank 54c. The pin shoulder 54d abuts the aft rail 48 for maintaining the predetermined or fixed axial distance between the pin head 54a and the rail 48, for in turn maintaining a fixed compression of the leaf spring 56 to control pre-load on the leaf seal 52. The leaf seal 52 engages the aft rail 48, with the leaf spring 56 being slightly compressed between the aft side of the pin head 54a and the forward side of the leaf seal 52.

The pin shoulder 54d may engage the aft rail 48 in various configurations. For example, FIG. 3 illustrates that each of the mounting holes 58 includes a step or counterbore extending inwardly from the rail first side 48a toward the second side 48b for complementarily receiving the pin shoulder 54d. In this way, the pin shoulder 54d is disposed inside the aft rail 48, and the larger diameter pin shank 54c is therefore more rigidly secured to the aft rail 48 in a cantilever fashion.

Figure 5:
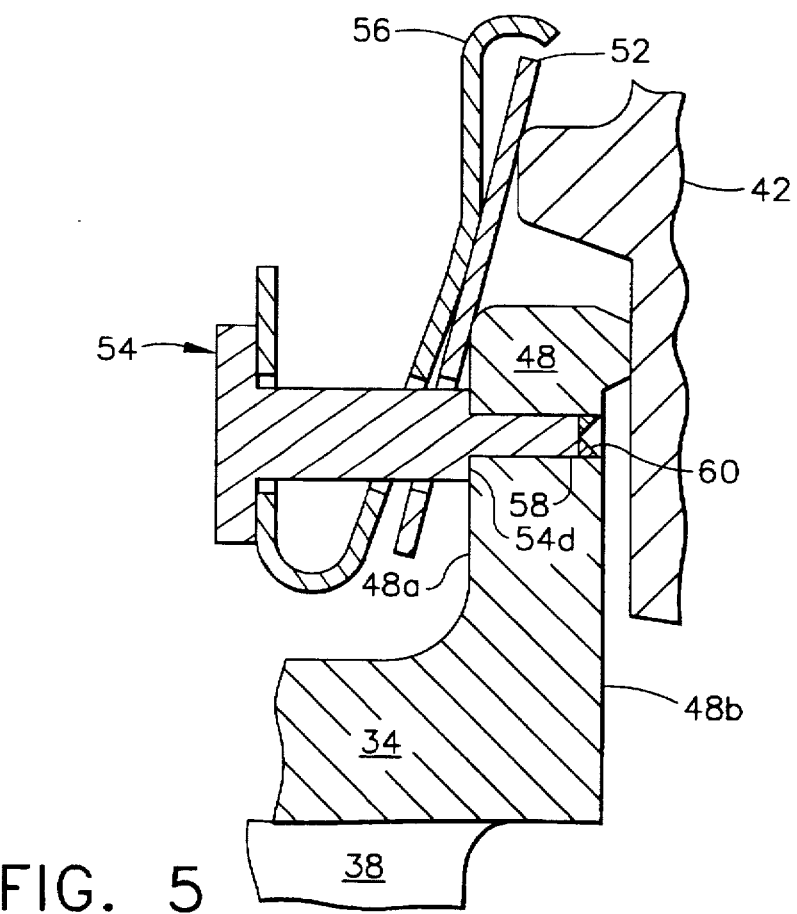
FIG. 5 is an enlarged axial sectional view of a flowpath seal similar to the seal illustrated in FIG. 3 having a different pin mounting embodiment.

Alternatively, FIG. 5 illustrates another embodiment wherein the mounting holes 58 are fully cylindrical between the rail first and second sides 48a,b with a common diameter, and the pin shoulders 54d axially abut the rail first side 48a. This avoids the additional step of forming the counterbore in the mounting hole 58 while still accurately positioning the head of the pin relative to the aft rail 48 for preferably compressing the leaf spring 56.

Referring again to FIGS. 3 and 4, the aft rail 48 further includes a circumferentially extending first arcuate seat 62 at the radially outer, outboard end thereof on the rail first side 48a for seating thereagainst an intermediate portion of the leaf seal 52 in line contact. As shown in FIG. 3, an arcuate pad 64 is disposed axially oppositely the first seat 62 integral with the rail second side 48b at the outboard end radially above the mounting holes 58.

Correspondingly, the hanger face 50 includes an outboard portion on an integral lip 42a which defines a second arcuate seat 66 which receives in axially abutting contact therewith an outboard portion of the leaf seal 52 for seating thereagainst in line contact around the circumference of the hanger 42. Accordingly, the leaf seal 52 frictionally engages and provides a secondary seal at the first and second seats 62, 66 to seal air leakage between the aft rail 48 and the hanger 42.

An inboard portion of the hanger forward face 50 below the lip 42a defines a flat radially extending land which receives in abutting contact therewith the rail pad 64 to provide a primary friction seal thereat. The rail pad 64 extends circumferentially for providing the primary seal around the circumference of the aft rail 48 and can accommodate differential radial movement between the aft rail 48 and the hanger 42. The rail pad 64 suitably projects axially aft of the pin mounting holes 58 above the inboard portion of the rail second side 48b to provide a suitable hinge for accommodating skewing of the components while maintaining an effective primary seal along the pads 64.

In this way, the rail pad 64 and cooperating forward face 50 of the shroud hanger 42 provide primary sealing between these components, with the leaf seal 52 being mounted in an improved arrangement for providing a secondary seal between these components. The mounting arrangement is relatively simple yet eliminates the previously used integral mounting tabs extending from the outer band 34 for enjoying the several benefits described above.

Although the improved flowpath seal 32 has been specifically described with respect to sealing the outboard aft end of the turbine nozzle 20 with the adjoining shroud 40 and shroud hanger 42, it may be suitably located and adapted for sealing between any adjacent stator components in the turbine section of the engine 10. Leaf seals are commonly found in turbines in high pressure and low pressure turbine sections between the stationary turbine nozzles and blade shrouds and hangers. The improved flowpath seal 32 may therefore be used to replace any similarly configured leaf seal otherwise pin mounted using tabs for supporting the pin heads.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine seal comprising:
   a first arcuate segment defining a flowpath boundary between combustion gases inboard thereof and air outboard thereof, and having a radially outwardly extending rail at one end thereof;
   a second arcuate segment disposed coaxially with said first segment for defining a continuation of said flowpath boundary, and having a radially extending face adjoining said rail;
   a leaf seal bridging said rail and said face for sealing leakage therebetween of said air outboard of said first segment;
   a plurality of mounting pins extending through said leaf seal, with each pin having a head at a distal end, and a tip at a proximal end, with said pins being fixedly joined to said rail solely about said pin tips for freely supporting said pin heads in a cantilever without obstruction therearound; and
   a leaf spring mounted on said pins between said pin heads and said leaf seal to pre-load said leaf seal against said rail and face to effect said sealing therebetween.

2. A seal according to claim 1 wherein said rail includes first and second axially opposite sides having a plurality of mounting holes extending therebetween, and said pin tips are disposed in said mounting holes and fixedly joined thereto.

3. A seal according to claim 2 wherein said pin heads and leaf seal are disposed adjacent said rail first side, and said pin tips extend to said rail second side and are fixedly joined thereto.

4. A seal according to claim 3 wherein each of said pins further includes a stepped shoulder between said head and tip for axially abutting said rail around said mounting hole for maintaining a fixed compression of said leaf spring to control said leaf seal pre-load.

5. A seal according to said claim 4 wherein said pin tips are metallurgically bonded to said rail at said mounting holes from said rail second side.

6. A seal according to claim 5 wherein each of said mounting holes in said rail includes a counterbore extending inwardly from said rail first side for complementarily receiving said pin shoulder.

7. A seal according to claim 5 wherein said mounting holes are cylindrical between said rail first and second sides, and said pin shoulders abut said rail first side.

8. A seal according to claim 5 wherein:
   said rail further includes a first seat at an outboard end thereof on said first side for seating thereagainst a portion of said leaf seal, and an arcuate pad at said outboard end thereof on said second side; and
   said face includes an outboard portion defining a second seat receiving in abutting contact therewith an outboard portion of said leaf seal to provide a secondary seal thereat, and an inboard portion defining a flat land receiving in abutting contact therewith said rail pad to provide a primary seal thereat.

9. A seal according to claim 8 further comprising:
   a turbine nozzle for channeling said combustion gases to a plurality of turbine blades, said nozzle including a plurality of circumferentially spaced apart vanes mounted between an outer band defining said first segment and an inner band; and
   a turbine shroud supported to a shroud hanger defining said second segment, and disposed coaxially with said turbine nozzle for defining an outer flowpath boundary around said turbine blades.

10. A seal according to claim 9 wherein said nozzle outer band includes axially spaced apart forward and aft rails, and said leaf seal and spring are mounted to said aft rail by said mounting pins to provide said primary and secondary seals with said shroud hanger.

* * * * *